United States Patent [19]
Hardy et al.

[11] 3,853,849
[45] Dec. 10, 1974

[54] ALPHA(ARYLOXYCARBONYL)-AND ALPHA(ALKOXY-CARBONYL-ARALKYL PENICILLINS

[75] Inventors: Kenneth David Hardy, Sussex; John Herbert Charles Nayler; Edward Raymond Stove, both of Surrey, all of England

[73] Assignee: Beecham Group Limited, Brentford Middlesex, England

[22] Filed: Feb. 8, 1971

[21] Appl. No.: 113,740

Related U.S. Application Data

[63] Continuation of Ser No. 833,848, May 29, 1969, abandoned, which is a continuation of Ser. No. 679,995, Nov. 2, 1967.

[52] U.S. Cl. ............................ 260/239.1, 424/271
[51] Int. Cl. ............................................. C07d 99/16
[58] Field of Search ................................. 260/239.1

[56] References Cited
UNITED STATES PATENTS

| | | | |
|---|---|---|---|
| 3,282,926 | 11/1966 | Brain et al. | 260/239.1 |
| 3,492,291 | 1/1970 | Brain et al. | 260/239.1 |
| 3,631,056 | 12/1971 | Butler | 260/239.1 |
| 3,651,050 | 3/1972 | Nakanishi | 260/239.1 |

Primary Examiner—Nicholas S. Rizzo

[57] ABSTRACT

New penicillins are provided which are α(aryloxycarbonyl)- and α(alkoxycarbonyl)-aralkyl penicillins represented by benzylpenicillins and thienylalkyl penicillins in which the α-carbon atom has an esterified —COOH group and wherein the ester group is phenyl, substituted phenyl, naphthyl, substituted naphthyl or similar groups. The new penicillins are particularly useful against Gram-negative bacteria.

4 Claims, No Drawings

ALPHA(ARYLOXYCARBONYL)-AND ALPHA(ALKOXY-CARBONYL)-ARALKYL PENICILLINS

This application is a continuation of application Ser. No. 833,848 filed May 29, 1969 which in turn is a continuation of Ser. No. 679,995 filed Nov. 2, 1967.

This invention relates to new penicillins, and more particularly to a class of α(aryloxycarbonyl- and α(alkoxycarbonyl)-aralkylpenicillins.

These penicillins are active against Gram-positive and Gram-negative bacteria which makes them useful as therapeutic and prophylactic agents against bacterial infections in animals, including man and poultry.

The new penicillins are of the general formula (I)

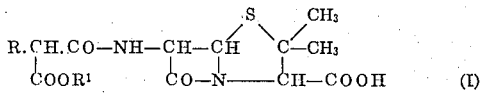   (I)

wherein R is a phenyl, substituted phenyl, furyl or thienyl group and $R^1$ is a phenyl, substituted phenyl, naphthyl or substituted naphthyl group or the group

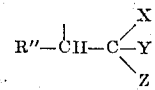

where R'' is a hydrogen atom or an alkyl, phenyl, halogenomethyl or alkylsulphonylmethyl group, X is a halogen atom or a nitro, alkoxy, aryloxy, aralkoxy, alkylsulphonyl, arylsulphonyl or aralkylsulphonyl group and Y and Z are the same or different and each may be a hydrogen or halogen atom or a methyl or ethyl group or when X is an alkoxy or aralkoxy group Y and Z may together represent an oxygen atom.

The penicillins may be presented as free acids or as non-toxic salts. The non-toxic salts include metallic salts such as sodium, potassium, calcium and aluminium, ammonium and substituted ammonium salts, e.g., salts of such non-toxic amines as trialkylamines(including triethylamine), procaine, dibenzylamine, N-benzyl-beta-phenethylamine, 1-ephenamine, N,N'-dibenzylethylenediamine, dehydroabietylamine, N,N'-bis-dehydroabietylethylenediamine, and other amines which have been used to form salts with benzylpenicillin.

The penicillins of formula (I) are prepared by acylating 6-aminopenicillanic acid with a reactive acylating derivative of formula (II)

   (II)

in which R and $R^1$ are as defined above and Q is a functional group of the type used for acylating primary amines such as a chlorine or bromine atom (i.e., II is an acyl halide), an azido group, an acyloxy or alkoxycarbonyloxy group (i.e., II is an acid anhydride or mixed anhydride) or a 1-imidazolyl or N,N'-disubstituted isoureido group (i.e., II is an intermediate formed from the half ester of an α-substituted malonic acid and a condensing agent such as carbonyldiimidazole or a N,N'-disubstituted carbodiimide such as dicyclohexylcarbodiimide). Some of these acylating agents of formula (II) are unstable substances which are preferably freshly prepared in a suitable solvent below room temperature and used in situ.

The penicillins of formula (I) contain at least one asymmetric carbon atom and so a single compound as represented by formula (I) may exist in several different spatial configurations. However, since all of the compounds of one formula are merely epimers or stereoisomers of each other it is to be understood that they are all covered by the definition of formula (I); thus the invention covers the D and L forms as well as the DL mixtures.

A penicillin of formula (I) may be presented for biological use in the form of its free acid or as a non-toxic salt and this may be presented alone or in association with a suitable pharmaceutical carrier, which term is to be interpreted in the widest sense to include such carriers as foodstuffs as well as diluents, binders, solvents, flavouring agents, colouring agents, and other conventional vehicles and additives and capsules and other carriers in the form of unit dose containers. Other therapeutic agents may also be included.

The invention is illustrated by the following examples.

EXAMPLE 1

Mono-phenyl phenylmalonate

Phenylmalonic acid (27 g. 0.15 mol.) was mixed with dry ether (80 ml.) and treated with thionyl chloride (17.85 g. 10.9 ml. 1 equiv.) and dimethylformamide (4 drops). The mixture was refluxed for 3 hours on a hot water bath. The solvent was evaporated under reduced pressure and the residue dissolved in fresh dry ether (80 ml.). Phenol (14.1 g. 0.15 mol.) was added all at once and the mixture refluxed for a further 2 hours. The reaction was cooled to room temperature, washed with water (25 ml.) and extracted with saturated sodium bicarbonate solution until the extracts were alkaline. The combined aqueous extracts were washed with ether (100 ml.) and acidified with 5N. hydrochloric acid. The precipitated oil was extracted exhaustively with methylene chloride. The combined organic extracts were washed thoroughly with water (6 × 120 ml.) dried over anhydrous magnesium sulphate and evaporated. The solid residue was crystallised from benzene to give a colourless crystalline solid 30.2 g. (78.7 percent) m.p. 115°–117°C. (Found: C,73.79; H,5.14. $C_{15}H_{12}O_4.½ C_6H_6$ requires : C,73.25; H,5.12).

α-(Phenoxycarbonyl)benzylpenicillin sodium salt

Mono-phenyl phenylmalonate (5.12 g. 0.02 mol.) was mixed with thionyl chloride (20 ml.) and heated in a water bath at 75°C for 1 hour. The excess thionyl chloride was evaporated under reduced pressure. The residue was mixed with dry benzene (10 ml.) and again evaporated to dryness to remove residual thionyl chloride. The final residue was dissolved in dry acetone (100 ml.) and added, with stirring, to a solution of 6-amino-penicillanic acid (4.32 g. 0.02 mol) in water (100 ml.), N. sodium hydroxide (20 ml.), N. sodium bicarbonate solution (30 ml.) and acetone (50 ml.) cooled to 12°C. The reaction mixture was stirred at room temperature for 2 hours. The resulting solution was extracted with ether (3 × 60 ml.) and the extracts discarded. The aqueous layer was covered with ether (60 ml.) and acidified with N. hydrochloric acid to pH 2. The ether layer was separated and the aqueous layer extracted with further ether (2 × 60 ml.). The combined ether extracts were washed with water (20 ml.) and extracted with N. sodium bicarbonate solution to pH 7. The neutral aqueous extract was evaporated under reduced temperature and pressure. The residue was dried over phosphorous pentoxide in vacuo to give 6.7 g. (70.4 percent) of the penicillin salt as an amorphous solid. The solid, when dissolved in ethanol (50 ml.) at room temerature gave on standing 30 minutes the penicillin salt as a colourless crystalline solid 5.23 g. (78.1 percent recovery).

EXAMPLE 2

Mono-(o-ethoxycarbonylphenyl)phenylmalonate

Phenylmalonic acid (27 g. 0.15 mol.) in dry ether (80 ml.) was converted to the mono-acid chloride and reacted with ethyl salicylate (24.9 g. 21.92 ml. 0.15 mol) as described in Example 1. The crude product was recrystallised from benzene/60° – 80° petroleum ether to give a colourless crystalline solid 13.2 g. (26.8 percent)m.p. 98°–100°C. (Found: C, 66.06; H,4.85 $C_{18}H_{16}O_6$ requires C,65.86; H, 4.91).

α-(o-Ethoxycarbonylphenoxycarbonyl)benzylpenicillin sodium salt

Mono-(o-ethoxycarbonylphenyl)phenylmalonate (3.28 g. 0.01 mol.) was converted to the acid chloride and reacted with 6-aminopenicillanic acid (2.16 g. 0.01 mol.) as described in Example 1, to give the penicillin sodium salt 4 g. (73 percent) as a colourless non-crystalline solid.

EXAMPLE 3

Mono-(o-benzyloxycarbonylphenyl)phenylmalonate

Phenylmalonic acid (27 g. 0.15 mol.) in dry ether (80 ml.) was converted to the mono-acid chloride and reacted with benzyl salicylate (34.2 g. 29.1 ml. 0.15 mol.) as described in Example 1. The crude product was recrystallised from benzene/60°–80° petroleum ether to give a colourless crystalline solid 13.75 g. (23.5 percent) m.p. 105°–108°C. (Found: C, 70.03; H, 4.51. $C_{23}H_{18}O_6$ requires C, 70.75; H, 4.65).

α-(o-Benzyloxycarbonylphenoxycarbonyl)benzyl-penicillin sodium salt

Mono-(o-benzyloxycarbonylphenyl)phenylmalonate (3.9 g. 0.01 mol.) was converted to the acid chloride and reacted with 6-aminopenicillanic acid (2.16 g. 0.01 mol.) as described in Example 1 to give the penicillin sodium salt 4 g. (65.6 percent) as a colourless non-crystalline solid.

EXAMPLE 4

Mono-(2,6-dimethoxyphenyl)phenylmalonate

Phenylmalonic acid (27 g. 0.15 mol.) in dry ether (80 ml.) was converted to the mono-acid chloride and reacted with 2,6-dimethoxy-phenol (23.1 g. 0.15 mol.) as described in Example 1. The crude product was recrystallised from benzene/60°–80° petroleum ether to give 30.2 g. (63.7 percent) of colourless crystals m.p. 131°–133°C. (Found: C,64.57; H,5.01. $C_{17}H_{16}O_6$ requires C,64.54; H,5.10.).

α-(2,6-Dimethoxyphenoxycarbonyl)benzylpenicillin sodium salt

Mono-2,6-dimethoxyphenyl phenylmalonate (3.16 g. 0.01 mol.) was converted to the acid chloride and reacted with 6-aminopenicillanic acid (2.16g. 0.01 mol) as described in Example 1 to give the penicillin sodium salt 4.1 g. (76.5 percent) as a colourless non-crystalline solid.

EXAMPLE 5

Mono-2-naphthyl phenylmalonate

Phenylmalonic acid (27 g. 0.15 mol.) in dry ether (80 ml.) was converted to the mono-acid chloride and reacted with 2-naphthol (21.6 g. 0.15 mol.) as described in Example 1 to give an acidification of the bicarbonate extract a crude solid 37.2 g. (81 percent) m.p. 131°–133°C. Recrystallisation from benzene/60°–80° petroleum ether gave a colourless crystalline solid 34.9 g. (76.0 percent) m.p. 131.5°–133.5° C. (Found: C, 74.88; H,4.87. $C_{19}H_{14}O_4$ requires: C,74.50; H, 4.60).

α-(2-Naphthoxycarbonyl)benzylpenicillin sodium salt

Mono-2-naphthyl phenylmalonate (3.06 g. 0.01 ml.) was converted to the acid chloride and reacted with 6-aminopenicillanic acid (2.16 g. 0.01 ml.) as described in Example 1 to give the penicillin sodium salt 2.9 g. (55.1 percent) as a cream coloured non-crystalline solid.

EXAMPLE 6

Mono-phenyl 3-thienylmalonate

3-Thienylmalonic acid (9.3g. 0.05 mol.) in dry ether (30 ml.) was converted to the mono-acid chloride and reacted with phenol (4.7 g. 0.05 mol.) as described in Example 1. The crude solid was recrystallised from benzene/60°–80° petroleum ether to give a colourless crystalline solid 2.89 g. (22.1 percent) m.p. 120°–122°C. (Found: C,59.33; H,3.68; S,11.78. $C_{13}H_{10}O_4S$ requires : C, 59.51; H,3.84; S,12.33.).

α-Phenoxycarbonyl)3-thienylmethylpenicillin sodium salt

Mono-phenyl 3-thienylmalonate (2.62g. 0.01 mol) was converted to the acid chloride and reacted with 6-aminopenicillanic acid (2.16 g. 0.01 ml.) as described in Example 1 to give the penicillin sodium salt 3.4 g. (70.6 percent) as a cream coloured non-crystalline solid.

EXAMPLE 7 a. Mono-2,2,2-trichloroethyl phenylmalonate

Phenylmalonic acid (54 g. 0.3 mol) was mixed with dry ether (160 ml.) and treated with thionyl chloride (35.7 g. 21.8 ml. 1 equivalent) and dimethylformamide (8 drops). The mixture was refluxed for 4 hours on a hot water bath. The solvent was evaporated under reduced pressure, and the residue was dissolved in fresh dry ether (160 ml.). 2,2,2-Trichloroethanol (44.85 g. 0.3 mol.) was added all at once and the mixture heated under reflux for a further 2 hours. The reaction was cooled to room temperature, washed with water (50 ml.) and extracted with saturated sodium bicarbonate solution until the extracts were alkaline. The combined aqueous extracts were washed with ether (200 ml.) and acidified with 5 N. hydrochloric acid. The precipitated oil was extracted exhaustively with methylene chloride. The combined organic extracts were washed thoroughly with water (6 × 240 ml.), dried over anhydrous magnesium sulphate and evaporated. The oily residue was triturated with light petroleum (boiling range 60°–80°C) to give a colourless crystalline solid 58.8g. (62.9 percent) m.p. 54°–56°C. The product was recrystallised from cyclohexane to give pure material 40 g. (42.8 percent) m.p. 58°–60°C. (Found: C,43.09; H,3.11; Cl, 33.91. $C_{11}H_9O_4Cl_3$ requires: 42.40; H,2.91; Cl 34.15 percent).

b. α-(2,2,2-Trichloroethoxycarbonyl)benzylpenicillin sodium salt

Mono-2,2,2-trichloroethyl phenylmalonate (9.35 g. 0.03 mol.) was mixed with thionyl chloride (30 ml.) and heated in a water bath at 75°C for 1 hour. The excess thionyl chloride was evaporated under reduced pressure. The residue was mixed with dry benzene (5 ml.) and again evaporated to dryness to remove residual thionyl chloride. The final residue was dissolved in dry acetone (150 ml.) and added, with stirring, to a solution of 6-aminopenicillanic acid (6.4g. 0.03 mol.) in water (150 ml.), N.sodium hydroxide (30 ml.), N.sodium bicarbonate solution (45 ml.) and acetone (75 ml.) cooled to 12°C. The reaction mixture was stirred at room temperature for 2 hours. The resulting solution was extracted with ether (3 × 100 ml.) and the extracts were discarded. The aqueous layer was covered with ether (100 ml.) and acidified, with rapid stirring, to pH 2 with N.hydrochloric acid. The ether layer was separated and the aqueous layer extracted with ether (2 × 100 ml.). The combined ether extracts were washed with water (30 ml.) and extracted with N.sodium bicarbonate solution to pH 7. The neutral aqueous extract was evaporated under reduced temperature and pressure. The residue was dried over phosphorus pentoxide in vacuo to give 11.2g. (70.2 percent) of the penicillin salt as an amorphous solid.

EXAMPLE 8

Mono-2-phenoxyethyl phenylmalonate

Phenylmalonic acid (27g. 0.15 mol.) in dry ether (80 ml.) was converted to the mono acid chloride and reacted with 2-phenoxyethanol (20.7 g. 18.8ml. 0.15 mol) by the method described in Example 7(a) to give 32.8g. (72.9 percent) of crude ester m.p. 77°–79°C. This was recrystallised from a mixture of light petroleum (boiling range 60°–80°C) and benzene to give 29.4 g. (65.3 percent) of a colourless crystalline solid m.p. 79.5°14 81.5°C. (Found: C,68.23; H,5.85. $C_{17}H_{16}O_5$ requires C,68.0; H,5.37 percent).

α-(2-Phenoxyethoxycarbonyl)benzylpenicillin sodium salt

Mono-2-phenoxyethyl phenylmalonate (9g. 0.03 mol.) was converted to the acid chloride and reacted with 6-aminopenicillanic acid (6.48 g. 0.03 mol.) by the method described in Example 7(b) to give the penicillin 14.5 g. (93 percent) as a colourless non-crystalline solid.

EXAMPLE 9

Mono-2-(p-toluenesulphonyl)ethyl phenylmalonate

Phenylmalonic acid (18g. 0.1 mol.) in dry ether (60 ml.) was converted to the mono acid chloride and reacted with 2-(p-toluenesulphonyl) ethanol (20g. 0.1 mol) by the method described in Example 7(a). The crude product was recrystallised from benzene to give 8.9 g. (24.6 percent) of colourless crystals m.p. 79°–81°C. Found: C,60.49; H,5.19; S,8.75. $C_{18}H_{18}O_6S$ requires: C,59.67; H,5.00; S,8.84 percent).

α-[2-(p-Toluenesulphonyl)ethoxycarbonyl]benzylpenicillin sodium salt

Mono-2-(p-toluenesulphonyl)ethyl phenylmalonate (3.62g. 0.01 mol.) was converted to the acid chloride and reacted with 6-aminopenicillanic acid (2.16 g. 0.01 mol.) by the method of Example 7(b) to give the penicillin 4.6g. (79 percent) as a colourless non-crystalline solid.

EXAMPLE 10

Mono-2-nitrobutyl phenylmalonate

Phenylmalonic acid (27 g. 0.15 mol.) in dry ether (80 ml.) was converted to the mono acid chloride and reacted with 2-nitrobutanol-1 (17.9g. 15.7 ml. 0.15 mol.) by the method of Example 7(a). The crude product after three recrystallisations from benzene/60°–80°C light petroleum gave colourless platelets 5.5 g. (13.1 percent) m.p. 80°–82°C. designated the α-stereoisomeric form. (Found: C,55.83; H,5.98; N, 4.91. $C_{13}H_{15}O_6N$ requires C,55.50; H,5.38; N,4.99 percent).

Dilution of the mother liquors from the first recrystallisation above gave a crude solid which, after four recrystallisations from benzene/60°–80°C light petroleum gave a granular crystalline solid 0.8 g. m.p. 79°–81°C. designated the β-stereoisomeric form. (Found: C,55.62; H,5.50; N,5.01. $C_{13}H_{15}O_6N$ requires C,55.50 H, 5.38; N,4.99 percent). Mixed m.p. of the two forms gave m.p. 66°–74°C.

α-(2-Nitrobutoxycarbonyl)benzylpenicillin sodium salt i. The α-form of 2-nitrobutyl phenylmalonate (2.81g. 0.01 mol.) was converted to the acid chloride and reacted with 6-aminopenicillanic acid by the method of Example 7(b) to give the penicillin 3.9g. (77.9 percent) as a cream coloured non-crystalline solid.

ii. The β-form of mono 2-nitrobutyl phenylmalonate (0.7g. 0.0025 mol.) was reacted as above to give the penicillin 0.8g. (64 percent) as a cream coloured non-crystalline solid.

EXAMPLE 11

Mono-1,3-dibromo-2-propyl phenylmalonate

Phenylmalonic acid (27g. 0.15 mol.) in dry ether (80 ml.) was converted to the mono acid chloride and reacted wth 1,3-dibromopropanol-2 (32.7g. 15.5 ml. 0.15 mol.) by the method of Example 7(a) to give the crude ester 43.1g. (75.6 percent) m.p. 75°–77°C. Recrystallisation from benzene/60°–80°C light petroleum gave 35.4 g. (62.1 percent) of a colourless crystalline solid m.p. 77°–79°C. (Found: C,38.04; H,3.51; Br,42.20. $C_{12}H_{12}O_4Br_2$ requires C,37.93; H,3.18; Br, 42.06 percent).

α-(1,3-Dibromo-2-propoxycarbonyl)benzylpenicillin sodium salt

Mono 1,3-dibromo-2-propyl phenylmalonate (7.6 g. 0.02 mol.) was converted to the acid chloride and reacted with 6-aminopenicillanic acid (4.32 g. 0.02 mol.) according to the method of Example 7(b) to give the penicillin 8.5 g. (70.8 percent) as a colourless non-crystalline solid.

EXAMPLE 12

Mono 1-ethoxycarbonylethyl phenylmalonate

Phenylmalonic acid (27g. 0.15 mol.) in dry ether (80 ml.) was converted to the mono acid chloride and reacted with ethyl-DL-lactate (17.7g. 17.0ml. 0.15 mol.) according to the method of Example 7(a) to give the crude ester as a partially crystalline oil. The solid was filtered from the oil and recrystallised from benzene/6-0°–80°C light petroleum to give 4.6 g. (11 percent) of a colourless crystalline solid m.p. 78°–80°C. (Found: C,59.88; H,6.03. $C_{14}H_{16}O_6$ requires C,59.98; H, 5.75 percent).

α-(1-Ethoxycarbonylethoxycarbonyl)benzylpenicillin sodium salt

Mono 1-ethoxycarbonyl phenylmalonate (2.8g. 0.01 mol.) was converted to the acid chloride and reacted with 6-aminopenicillanic acid (2.16g. 0.01 mol.) according to the method of Example 7(b) to give the penicillin 4.3g. (86 percent) as a colourless non-crystalline solid.

EXAMPLE 13

Mono-α-ethoxycarbonylbenzyl phenylmalonate

Phenylmalonic acid (27g. 0.15 mol.) in dry ether (80 ml.) was converted to the mono acid chloride and reacted with ethyl-DL-mandelate (27g. 0.15mol) according to the method of Example 7(a) to give the crude ester 42.8g. (83.4 percent). After three recrystallisations from benzene/60°–80°C light petroleum a colourless crystalline solid 13.2g. (25.7 percent) was obtained m.p. 95°–97°C. (Found: C,66.36; H,5.53. $C_{19}H_{18}O_6$ requires C,66.66; H.5.30 percent).

α-(α-Ethoxycarbonylbenzyloxycarbonyl)benzylpenicillin sodium salt

Mono α-ethoxycarbonylbenzyl phenylmalonate (3.42g. 0.01 mol.) was converted to the acid chloride and reacted with 6-aminopenicillanic acid (2.16g. 0.01 mol.) according to the method of Example 7(b) to give the penicillin 3.6 g. (64.1 percent) as a colourless non-crystalline solid.

EXAMPLE 14

Mono 2,2,2-trichloroethyl 3-thienylmalonate

In an analogous reaction to that described in Example 7(a) for phenylmalonic acid 3-thienylmalonic acid (9.3g. 0.05 mol.) in dry ether (30 ml.) was converted to the mono acid chloride and reacted with 2,2,2-trichloroethanol (7.48g. 0.05 mol.) to give the crude ester as an oil. Trituration of the oil with 40°–60°C boiling range light petroleum gave a colourless crystalline solid 3.28g. (20.7 percent) m.p. 46°–48°C. (Found: C,34.37; H,2.37; Cl,33.68, S,9.93. $C_9 H_7O_4 Cl_3S$ requires C,34.04; H,2.22; Cl,33.52, S,10.01%).

α-(2,2,2-Trichloroethoxycarbonyl)-3-thienylmethylpenicillin sodium salt

Mono 2,2,2trichloroethyl 3-thienylmalonate (0.85g. 0.0027 mol.) was converted to the acid chloride and reacted with 6-aminopenicillanic acid (0.578g. 0.0027 mol.) by the method as described in Example 7(b)to give the penicillin 1g. (69.5 percent) as a cream coloured non-crystalline solid.

EXAMPLE 15

Mono-(2-nitro-2-methyl-1-propyl)phenylmalonate

Phenylmalonic acid (27 g., 0.15 mol) in dry ether (80 ml.) was converted to the mono-acid chloride and reacted with 2-nitro-2-methylpropanol-1 (17.85 g., 0.15 mol.) by the method described in Example 7(a). The crude product was recrystallised from benzene to give 38.5 g. (67.6 percent) of colourless crystals m.p. 91° – 93°C. Found: C,55.90; H,5.49; N,4.83. $C_{13}H_{15}O_6N$ requires: C,55.50; H,5.38; N,4.98 percent).

α-(2-Nitro-2-methyl-1-propyloxycarbonyl)benzylpenicillin sodium salt

Mono-2-nitro-2-methyl-1-propylphenylmalonate (2.81 g., 0.01 mol.) was converted to the acid chloride and reacted with 6-aminopenicillanic acid (2.16 g., 0.01 mol.) by the method of Example 7(b) to give the penicillin sodium salt 3.41 g. (68.1 percent) as a colourless non-crystalline solid.

EXAMPLE 16

Mono-2-ethylsulphonylethyl phenylmalonate

Phenylmalonic acid (27 g., 0.15 mol.) in dry ether (80 ml.) was converted to the mono-acid chloride and reacted with 2-ethylsulphonyl ethanol (20.7 g., 0.15 mol.) by the method described in Example 7(a). The crude product was recrystallised from ethylacetate /60° – 80° petroleum ether to give 16g. (35.6 percent) of colourless crystals m.p. 112°–114°C. Found: C,51.85; H, 5.25; S,11.02. $C_{13}H_{16}O_6S$ requires: C, 52.00; H, 5.37; S, 10.66 percent α-(2-Ethylsulphonylethoxycarbonyl)-benzylpenicillin sodium salt Mono-2-ethylsulphonylethylethylphenylmalonate (3.0g., 0.01mol.) was converted to the acid chloride and reacted with 6-aminopenicillanic acid (2.16 g., 0.01 mol.) by the method of Example 7(b) to give the penicillin sodium salt 3.4 g. (65.4 percent) as a colourless non-crystalline solid.

EXAMPLE 17

Mono-2,2,2-tribromoethylphenylmalonate

Phenylmalonic acid (27g., 0.15 mol.) in dry ether (80 ml.) was converted to the mono-acid chloride and reacted with 2,2,2-tribromoethanol (42.45g., 0.15 mol.) by the method described in Example 7(a). The crude product was recrystallised from benzene/60°–80° petroleum ether to give 51.9 g. (78 percent) of colourless crystals m.p. 108°–110°C. Found: C,29.87; H,2.16; Br, 54.16; $C_{11}H_9O_4Br_3$ requires: C, 29.69; H,2.04; Br, 53.88 percent.

α-(2,2,2-Tribromoethoxycarbonyl)benzylpenicillin sodium salt

Mono-2,2,2-tribromoethyl phenylmalonate (4.45 g. 0.01 mol.) was converted to the acid chloride and reacted with 6-aminopenicillanic acid (2.16 g., 0.01 mol.) by the method of Example 7(b) to give the penicillin sodium salt 3.8g. (57.2 percent) as a colourless non-crystalline solid.

EXAMPLE 18

Mono-2,2,2-trifluoromethyl phenylmalonate

Phenylmalonic acid (27 g., 0.15 mol.) in dry ether (80 ml.) was converted to the mono-acid chloride and reacted with 2,2,2-trifluoroethanol (15g., 0.15 mol.) by the method described in Example 7(a). The crude product was recrystallised from benzene/60°–80° petroleum ether to give 21.5 g. (54.7 percent) of colourless crystals m.p. 67°–69°C. Found: C,50.64; H,3.80; F, 22.20. $C_{11}H_9O_4F_3$ requires: C, 50.38; H,3.46; F, 21.74 percent.

α-(2,2,2-Trifluoroethoxycarbonyl)benzylpenicillin sodium salt

Mono-2,2,2-trifluoroethyl phenylmalonate (2.62 g. 0.01 mol.) was converted to the acid chloride and reacted with 6-aminopenicillanic acid (2.16 g., 0.01 mol.) by the method of Example 7(b) to give the penicillin sodium salt 3g. (62.2 percent) as a colourless non-crystalline solid.

EXAMPLE 19

Mono-[bis-(1,3-ethylsulphonyl)2-propyl]phenylmalonate

Phenylmalonic acid (27g., 0.15 mol.) in dry ether (80 ml.) was converted to the mono-acid chloride and reacted with bis-1,3-ethyl sulphonyl-2-propanol (36.6 g., 0.15 mol.) by the method described in Example 7(a). The crude product crystallised from the reaction mixture and was filtered off. The solid was heated in water and the hot solution decanted from insoluble oil, cooled and allowed to crystallise to give the product 3.2g. (5.2 percent). m.p. 111°–113°C.

α-[bis-(1,3 ethylsulphonyl)-2-propoxycarbonyl]benzylsodium salt

Mono-[bis(1,3-ethylsulphonyl)2-propyl]phenylmalonate (1.6 g., 0.00394 mol.) was converted to the acid chloride and reacted with 6-aminopenicillanic acid (0.851 g., 0.00394 mol.) by the method of Example 7(b). to give the penicillin sodium salt 0.7g. (28.4 percent) as a colourless non-crystalline solid.

EXAMPLE 20

Mono p-methoxyphenyl phenylmalonate

Phenylmalonic acid (27g., 0.15 mol.) in dry ether (80 ml.) was converted to the mono-acid chloride and reacted with p-methoxyphenol (18.62g., 0.15mol.) by the method described in Example 7(a). The crude product was recrystallised from benzene/40°–60° petroleum ether to give 31.3g. (72.8 percent) of colourless crystals m.p. 122.5°–123.5°C. Found: C,67.06; H,5.26. $C_{16}H_{14}O_5$ requires C,67.16; H,4.92 percent.

α-(p-Methoxyphenoxycarbonyl)benzylpenicillin sodium salt

Mono-p-methoxyphenyl phenylmalonate (2.86g., 0.01 mol.) was converted to the acid chloride and reacted with 6-aminopencillanic acid (2.16 g., 0.01 mol.) by the method of Example 7(b) to give the penicillin sodium salt 4.2g. (83 percent) as a colourless non-crystalline solid.

EXAMPLE 21

Mono-p-chlorophenyl phenylmalonate

Phenylmalonic acid (27g., 0.15mol.) in dry ether (80 ml.) was converted to the mono-acid chloride and reacted with p-chlorophenol (19.28g. 0.15 mol.) by the method of Example 7(a). The crude product was recrystallised from benzene 60°–80° petroleum ether to give 26.2g. (60.1 percent) of pale yellow crystals m.p. 123°–125°C. Found: C,65.31; H,4.31; Cl,11.29. $C_{15}H_{11}O_4Cl.½\ C_6H_6$ requires: C,65.57; H,4.28; Cl, 10.75 percent.

α-(p-Chlorophenoxycarbonyl)benzylpenicillin sodium salt

Mono-p-chlorophenyl phenylmalonate (2.9g., 0.01 mol.) was converted to the acid chloride and reacted with 6-aminopenicillanic acid (2.16g., 0.01 mol.) as in Example 7(b) to give the penicillin sodium salt 2.6g. (51 percent) as a colourless non-crystalline solid.

EXAMPLE 22

Mono-p-tolylphenylmalonate

Phenylmalonic acid (27g., 0.15 mol.) in dry ether (80 ml.) was converted to the mono-acid chloride and reacted with p-cresol (16.2g., 0.15 mol.) as described in Example 7(a). The crude product was recrystallised from benzene/60°–80° l petroleum ether to give 33g. (81.5 percent) of colourless crystals, m.p. 122°–124°C Found: C, 72.64; H,5.42. $C_{16}H_{14}O_4.½C_6H_6$ requires: C,73.77; H,5.54 percent.

α-(p-Tolyloxycarbonyl)benzylpenicillin sodium salt

Mono-p-tolylphenylmalonate (2.7g., 0.01 mol.) was converted to the acid chloride and reacted with 6-aminopenicillanic acid (2.16g., 0.01 mol.) as in Example 7(b) to give the penicillin 3.6 g. (73.5 percent) as a colourless non-crystalline solid.

EXAMPLE 23

α-(o-Carboxyphenoxycarbonyl)benzylpenicillin di-sodium salt

α-(o-Benzyloxycarbonylphenoxycarbonyl)benzylpenicillin sodium salt (2.5g., 0.0041 mol.) dissolved in water (100 ml.) was added to a prehydrogenated mixture of 5 percent palladium on calcium carbonate (9g.) in water (45 ml.) and hydrogenated at atmospheric pressure until no more hydrogen was absorbed. The reaction mixture was filtered through Celite and the filtrate acidified in the presence of ether to pH 2 with N hydrochloric acid. The product was worked up as in Example 7(b) to give the penicillin di-sodium salt 1.67g. (75.2percent) as a colourless non-crystalline solid.

EXAMPLE 24

Mono-phenyl-2-thienylmalonate

2-Thienylmalonic acid (7.38g., 0.0396 mol.) suspended in dry ether (30 ml.) was treated with oxalylchloride (7.2 ml.). The solution was refluxed with stirring for 2½ hours, cooled and concentrated under reduced temperature and pressure. Benzene was added and evaporated to remove the last traces of oxalyl chloride. The residue was treated with a solution of phenol (4g., 0.0425 mol.) in dry ether (10 ml.) and stirred at room temperature overnight. The reaction mixture was washed with brine and extracted with sodium bicarbonate solution. The aqueous alkaline extracts were acidified with 5N hydrochloric acid and exhaustively extracted with methylene chloride. The combined organic extracts were washed with brine, dried and stirred with decolourising charcoal. After filtration, the solvent was evaporated to give a buff coloured solid. One recrystallisation from benzene gave mono-phenyl 2-thienylmalonate 3.06g. (30 percent) as a crystalline solid m.p. 90°–94°C (d). Found: C,59.52; H,3.94; S,11.88.$C_{13}H_{10}SO_4$ requires C,59.511; H,3.84; S, 12.22 percent.

α-(Phenoxycarbonyl)2-thienylmethylpenicillin sodium salt

Mono-phenyl 2-thienylmalonate (2.31g., 0.0088 mol.) in dry ether (15 ml.) was converted to the acid chloride with oxalylchloride (3.8 ml.) and reacted with 6-amino-penicillanic acid by the method of Example 7(b). to give the penicillin soodium salt 1.29g. (30 percent) as a light brown amorphous solid.

What is claimed is:

1. A penicillin monoester of the formula:

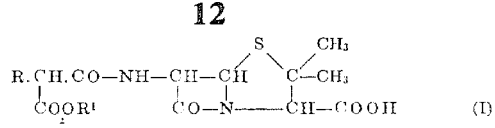

or a non-toxic pharmaceutically acceptable salt thereof, wherein R is phenyl, or 3-thienyl and $R^1$ is phenyl or methylphenyl.

2. The compound of claim 1 which is α-(phenoxycarbonyl) benzylpenicillin or its sodium salt.

3. The compound of claim 1 which is α-(phenoxycarbonyl)-3-thienylmethyl-penicillin or its sodium salt.

4. A compound of claim 1 wherein R is 3-thienyl and $R^1$ is phenyl or methylphenyl.

* * * * *